United States Patent
Lue et al.

(10) Patent No.: US 6,255,426 B1
(45) Date of Patent: Jul. 3, 2001

(54) EASY PROCESSING LINEAR LOW DENSITY POLYETHYLENE

(75) Inventors: Ching-Tai Lue; Natalie A. Merrill, both of Houston; Michael E. Muhle, Kingwood; George Alan Vaughan, Houston, all of TX (US)

(73) Assignee: Exxon Chemical Patents, Inc., Houston, TX (US)

( * ) Notice: Subject to any disclaimer, the term of this patent is extended or adjusted under 35 U.S.C. 154(b) by 0 days.

(21) Appl. No.: 09/048,569

(22) Filed: Mar. 26, 1998

Related U.S. Application Data

(60) Provisional application No. 60/042,310, filed on Apr. 1, 1997.

(51) Int. Cl.$^7$ .................................................. C08F 210/00

(52) U.S. Cl. ........................ 526/348; 526/88; 526/160; 526/340.2; 526/348.2; 526/348.1; 526/943

(58) Field of Search ..................... 526/160, 88, 348, 526/340.2, 348.2, 943, 348.1

(56) References Cited

U.S. PATENT DOCUMENTS

| | | | |
|---|---|---|---|
| 5,008,204 | 4/1991 | Stehling | 436/85 |
| 5,278,119 | 1/1994 | Turner et al. | 502/155 |
| 5,324,800 | 6/1994 | Welborn et al. | 526/160 |
| 5,336,746 | 8/1994 | Tsutsui et al. | 526/348.6 |
| 5,374,700 | 12/1994 | Tsutsui et al. | 526/348.3 |
| 5,403,014 | 4/1995 | Anema et al. | 273/292 |
| 5,407,884 | 4/1995 | Turner et al. | 502/155 |
| 5,466,649 | 11/1995 | Jejelowo | 502/120 |
| 5,525,689 | 6/1996 | Tsutsui et al. | 526/160 |
| 5,580,939 | 12/1996 | Ewen et al. | 526/127 |
| 5,633,394 | 5/1997 | Welborn et al. | 556/11 |
| 5,639,842 | 6/1997 | Tsutsui et al. | 526/348 |

FOREIGN PATENT DOCUMENTS

| | | |
|---|---|---|
| 129368 | 12/1984 | (EP) . |
| 277003 | 8/1988 | (EP) . |
| 277004 | 8/1988 | (EP) . |
| 374783 | 6/1990 | (EP) . |
| 452920 | 10/1991 | (EP) . |
| 0495099 A1 * | 7/1992 | (EP) . |
| 495099 | 7/1992 | (EP) . |
| 676421 | 10/1995 | (EP) . |
| 685496 | 12/1995 | (EP) . |
| WO 93/03093 | 2/1993 | (WO) . |
| WO 93/08221 | 4/1993 | (WO) . |
| WO94/14855 | 7/1994 | (WO) . |
| 94/14855 * | 7/1994 | (WO) . |
| WO 95/07942 | 3/1995 | (WO) . |
| WO 96/08520 | 3/1996 | (WO) . |
| WO97/29138 | 8/1997 | (WO) . |
| WO98/02483 | 1/1998 | (WO) . |

\* cited by examiner

*Primary Examiner*—David W. Wu
*Assistant Examiner*—Ling-Siu Choi
(74) *Attorney, Agent, or Firm*—Gerald L. Harris; Joseph F. Reidy; Stephen D. Prodnuk

(57) ABSTRACT

A polymer of ethylene and at least one alpha olefin having at least 5, carbon atoms obtainable by a continuous gas phase polymerization using supported catalyst of an activated molecularly discrete catalyst such as a metallocene in the substantial absence of an aluminum alkyl based scavenger which polymer has a Melt Index (MI) as herein defined of from 0.1 to 15; a Compositional Distribution Breadth Index (CDBI) as defined herein of at least 70%, a density of from 0.910 to 0.930 g/ml; a Haze value as herein defined of less than 20%; a Melt Index ratio (MIR) as herein defined of from 35 to 80; an averaged Modulus (M) as herein defined of from 20 000 to 60 000 psi (pounds per square inch) and a relation between M and the Dart Impact Strength in g/mil (DIS) complying with the formula:

$$DIS \geq 0.8 \times [100 + e^{(11.71 - 0.000268 \times M + 2.183 \times 10^{-9} \times M^2)}].$$

12 Claims, 1 Drawing Sheet

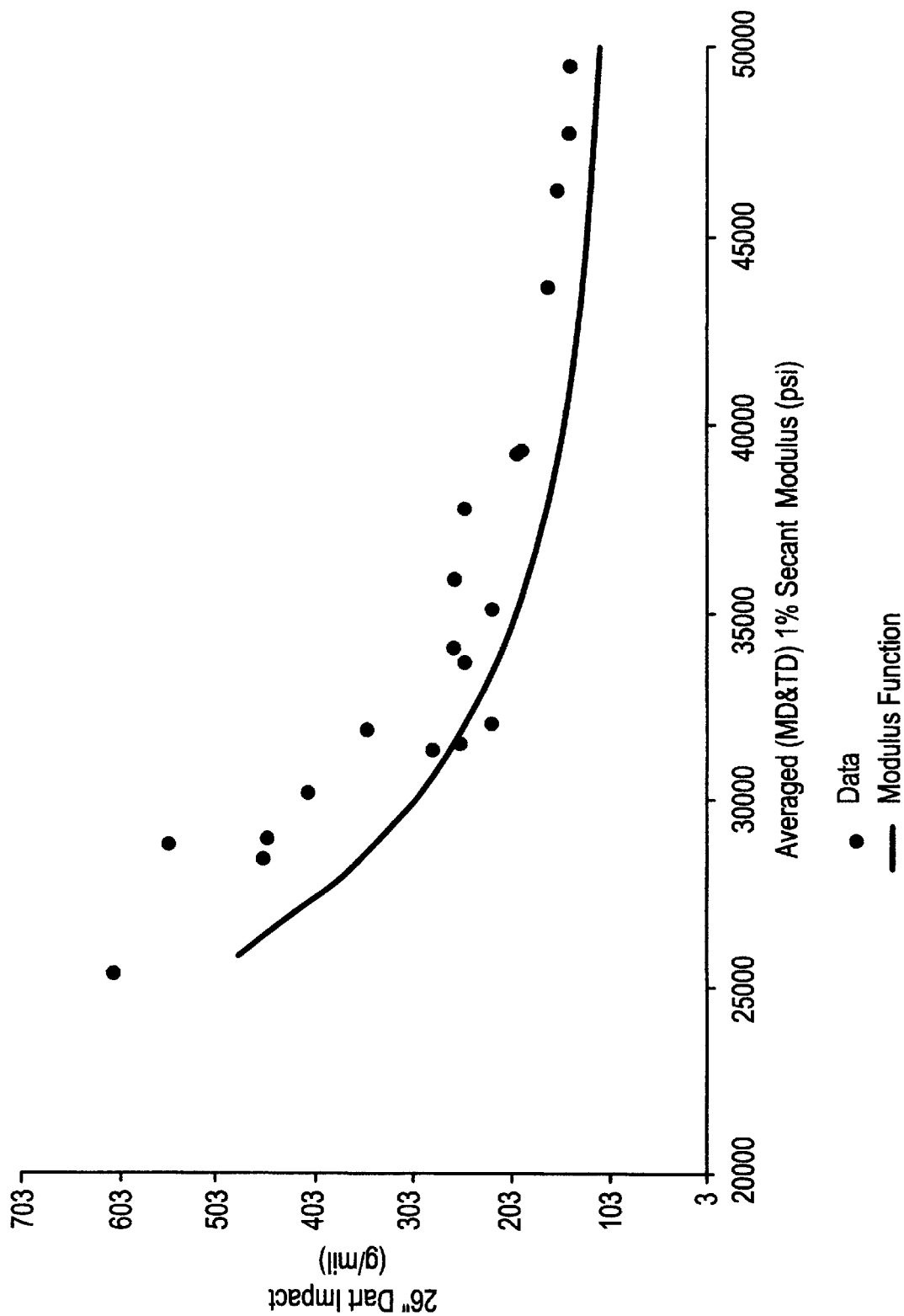

EASY PROCESSING LINEAR LOW DENSITY POLYETHYLENE

This application claims the benefit of Provisional Application Ser. No. 60/042,310 filed Apr. 1, 1997.

FIELD OF THE INVENTION

The invention relates to novel polyethylene compositions and particularly to polyethylene having improved combination of shear thinning behavior (to assist in the processing of such polymers in the molten state) and impact strength (to assist the end-use performance). The polymers can be optimally produced in a continuous gas phase processes in which supported catalyst is introduced into a fluidized bed reactor.

BACKGROUND OF THE INVENTION

Polyethylene produced from gas phase processes with a degree of branching to improve melt rheology are described in EP-A-495099; EP-A-452920; EP-A-676421 and EP-A-659773. WO 96/08520 (Exxon Chemical Patents Inc) discusses gas phase polymerization using low concentrations of scavenger, in other words, no or only a low amount of scavenger in the form of, for example triethyl aluminum, is used in the course of polymerization.

Polyethylene with improved rheology obtained with monocyclopentadienyl compounds are described in WO-A-93/08221.

U.S. Pat. Nos. 5,336,746; 5,525,689; and 5,639,842 (EP-A-495099) produce polyethylene using hafnium metallocene compounds having multidentate ligands (i.e. they have two cyclopentadienyl ring systems connected by a bridge). The specifically named hafnium compounds are bridged. The described polymerization is performed in a batch system. The polymerization is performed with unsupported catalyst in a solution phase, although mention is made of vapor phase operation. The properties of the resulting polyethylene include a narrow molecular weight distribution and a Melt Flow Rate (MFR expressed in g per 10 minutes at 190 C. under a load of 2.16 kg) of from 8–50. The abbreviation MFR is used to indicate Melt Flow Rate or Melt Flow Ratio depending on the source. Reference must be made to the original source in case of doubt to determine the meaning of MFR in a particular case.

U.S. Pat. No. 5,374,700 (EP-A-452920) does exemplify the use of supported catalyst for making polyethylene. The polymerization is in the gas phase using triisobutyl aluminum as a scavenger. The transition metal component includes zirconocenes. Example 9 and others use ethylene-bridged bis(indenyl)zirconium as the transition metal compound. Example 10 uses an Al/Zr ratio of 112. The scavenger helps to avoid the effect of adventitious poisons attached to the experimental equipment or introduced with the various components. The melt tension is said to be improved.

WO-A-95/07942 uses monocyclopentadienyl compounds in a gas phase on a support for producing polyethylene. The activator is not methyl alumoxane but a non-coordinating bulky anion first described in U.S. Pat. Nos. 5,278,119; 5,407,884; and 5,403,014 (EP-A-277003 and EP-A-277004). Polymerization was performed in a batch reactor. Scavenger was not mentioned.

U.S. Pat. No. 5466649 describes in Example 17 preparing polyethylene using a batch gas phase polymerization procedure using dimethylsilyl bis(tetrahydroindenyl) zirconium dichloride on one support and TMA (trimethyl aluminum) supported separately on another support. This was a batch reaction and no detailed indication of the polyethylene properties was given. U.S. patent application Ser. No. 08/306,055, incorporated by reference, (WO 96/08520) describes a continuous commercial gas phase operating process in which scavenger is either not present or is present in a reduced amount. One embodiment (see page 12, line 28) defines a system essentially free of scavenger, i.e. containing less than 10 ppm of scavenger based on the total weight of the feed gas, which is there referred to as the recycle stream. Alternatively, the low scavenger condition is defined in relation to the metallocene. On page 14, a molar ratio is defined of from 300 to 10. On page 15 it is indicated that the number of olefinic or unsaturated oligomers in the resulting polymer is greatly reduced.

EP-A-676421 exemplifies a batch type process and a continuous process for producing polyethylene which leads to an improved rheology product through introduction of long chain branching by the use of a supported bis-cyclopentadienyl transition metal compound having an alkylene or silyl bridge used in conjunction with a methylalumoxane cocatalyst. The batch reactions are with a scavenger (see page 5, line 28). Example 10 of this patent publication discloses an Melt Index (MI) of 0.3 g per 10 minutes determined at 190 C. under a 2.16 kg load; there is no indication of the molecular weight distribution, the Compositional Distribution is not given, the density is 0.916 g/ml, the Haze is 11%, there is no indication of the ratio of MI's determined under different loads, the Dart Impact Strength is 210 g/mil and there is no indication of the polymer stiffness as expressed by the modulus. On the basis of the correlation between density and secant modulus given in the *Encyclopedia of Polymer Science and Engineering,* by Mark, Bikales, Overberger, and Menges, Vol. 6, second ed., p.447 (1986), the secant modulus for this material is estimated to be about 30,000 to 32,000 psi (205 to 220 N/mm$^2$). EP-A-659773 discloses the use of bridged catalysts for the operation of a reactor in a continuous mode for the polymerization of polyethylene. The specification discloses the use of support (see page 6 line 30) but the examples do not use a support so that the alumoxane is in a solvent when injected. The use of an unsupported catalyst may favor fouling and furthermore the alumoxane will contain a significant amount of unreacted trimethyl aluminum (TMA) which may act as a scavenger and lead to an apparent increase in vinyl unsaturation. Melt processing is further influenced by the use of more than one metallocene component which can broaden the molecular weight distribution by the production of more than one distinct polymer component. This is done allegedly to provide control over the degree of long chain branching (LCB) as indicated by the degree of LCB determined by GPC and viscosity data. The melt flow ratio (MFR) is also used to characterize the polymer. The MFR is the ratio of melt index (MI) at different loads and reflects LCB and higher Mw/Mn. Increasing MFR values may be due to higher Mw/Mn caused by the use of more than one metallocene. The examples indicate that the bridged species is most instrumental in raising the level of LCB. However Example 5, which shows the use of the bridged metallocene alone, produces a polymer having a very low molecular weight, suggesting that the low molecular weight polymer species are a major contributor to higher MFR values. EP-A-659773 thus fails to teach how a low melt index material may be produced which has the improved rheology as expressed in MFR resulting from the presence of LCB. EP-A-659773 does not disclose the CDBI, haze and DIS values which help determine the commercial quality of the polymer produced.

EP-A-743327 describes the preparation of an ethylene polymer having a high polydispersity index (which can be represented by Mw/Mn) which requires a lower head pressure in extrusion. The improved rheological properties are expressed in terms of RSI (Relaxation Spectrum Index) which is said to be sensitive to molecular weight distribution, molecular weight and long chain branching. The polymerization process details are scant. EP-A-743327 includes as catalyst similar metallocenes to those listed in EP-A-659773.

EP-A-729978 characterizes an ethylene polymer using flow activation energy. The polymer is made using bridged bis cyclopentadienyl catalyst components, with one cyclopentadienyl ring system being a fluorenyl polynuclear ligand structure. The higher activation energy may be the result of higher levels of long chain branching.

Many different process or catalyst options are introduced in the above processes to achieve the desired effect in the melt processing of the resulting polymers. However it is suggested that these processes all suffer from drawbacks which mitigate against commercial implementation in that the catalyst may have low productivity, be prone to fouling in the longer runs used for large scale reactors and/or produce low molecular weight materials. In addition the prior proposals may lead to an undue sacrifice of physical properties such as loss of clarity, increase in extractability, which is detrimental in food contact applications, or loss of film toughness properties such as dart impact strength (DIS).

It is amongst the aims of the invention to provide a relatively simple process for providing commercially desirable polymer from commercial scale plants which has advantageous melt flow properties and balance of strength and stiffness.

The polymer can be produced in prolonged production runs under conditions not likely to lead to fouling.

SUMMARY OF THE INVENTION

The invention provides a polymer of an ethylene and at least one alpha olefin. The alpha olefin has 5 to 20 carbon atoms, more preferably 5 to 10 carbon atoms and most preferably 5 to 8 carbon atoms. The polymer of the present invention is obtainable by a continuous gas phase polymerization using supported catalyst of an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL) and the like), which polymer has a Melt Index (MI) as herein defined of from 0.1 to 15; a Compositional Distribution Breadth Index (CDBI) as defined herein of at least 70%, a density of from 0.910 to 0.930 g/ml; a Haze value as herein defined of less than 20; a Melt Index ratio (MIR) as herein defined of from 35 to 80; an averaged Modulus (M) as herein defined of from 20 000 to 60 000 psi ( pounds per square inch) (13790 to 41369 N/cm$^2$) and a relation between M and the Dart Impact Strength in g/mil ( DIS ) complying with the formula:

$$DIS \geq 0.8 \times [100 + e^{(11.71 - 0.000268 \times M + 2.183 \times 10^{-9} \times M^2)}],$$

where "e" represents 2.7183, the base Napierian logarithm, M is the averaged Modulus in psi and DIS is the 26 inch (66 cm) dart impact strength.

While many prior art documents describe processes and polymers using the same monomers and similar processes, none describe polymers combining [A] good shear thinning and therefore relatively favorable extrusion and other melt processing properties with [B] a high stiffness and [C] high impact strength. Up to now these features appeared to be difficult to combine in LLDPE (linear low density polyethylene) materials produced in a continuous gas phase process. The invention provides a surprising combination of properties for the polymer which can be prepared reproducibly.

In comparison to LDPE (low density polyethylene) made in the high pressure process having a comparable density and MI, the polyethylenes of the invention have a favorable DIS-Modulus balance, e.g., a dart impact strength (DIS) in g/mil that is greater than that predicted by the formula:

$$DIS \geq 0.8 \times [100 + e^{(11.71 - 0.000268 \times M + 2.183 \times 10^{-9} \times M^2)}],$$

where "e" is the base Napierian logarithm and M is the averaged modulus in psi and DIS is the minimum dart impact strength for the polymer in g/mil.

In comparison with LLDPE made by a gas phase process using conventional Ziegler Natta supported catalysts, the polyethylenes of the invention have improved shear thinning. These conventionally produced LLDPE's will have a relatively low CDBI and a poor DIS-Modulus balance, e.g., a dart impact strength in g/mil that is less than that predicted by the above formula.

In comparison to the EXCEED™ materials (made by Exxon Chemical) produced in gas phase processes using metallocene based supported catalysts, the polyethylenes of the invention have a better shear thinning behavior and comparable other properties. The MIR will be from 16 to 18 for such EXCEED materials.

DESCRIPTION OF THE DRAWINGS

FIG. 1 is a drawing showing the relationship between the averaged modulus in psi and the dart impact strength (DIS) in g/mil for a number of polymers as well as depicting the formula:

$$DIS \geq 0.8 \times [100 + e^{(11.71 - 0.000268 \times M + 2.183 \times 10^{-9} \times M^2)}],$$

where "e" is the base Napierian logarithm and M is the averaged modulus in psi and DIS is the dart impact strength of the polymer in g/mil.

DETAILED DESCRIPTION

In a preferred form of the invention, the polyethylenes of the invention are derived from ethylene and up to 15 weight percent of 1-hexene. Preferably, the relation between the Modulus and the Dart Impact Strength complies with the formula:

$$DIS \leq 2.0 \times [100 + e^{(11.71 - 0.000268 \times M + 2.183 \times 10^{-9} \times M^2)}],$$

where "e" is the base Napierian logarithm and M is the averaged Modulus in psi and DIS is the dart impact strength of the polymer in g/mil.

Advantageously, the polymer may have either one or combination of the following features: the density is from 0.915 to 0.927 g/ml, the MI is from 0.3 to 10 and CDBI is at least 75%. Most preferred is a DIS is from 120 to 1000 g/mil, especially less than 800 and more than 150 g/mil. Preferably the Mw/Mn by GPC is from 2.5 to 5.5

As to the process conditions, the overall conditions described in U.S. patent application Ser. No. 08/306,055 (WO 96/08520), incorporated by reference herein, can be adopted. Inventors believe that a combination of particular process conditions helps to make the polyethylene of the invention. In particular, it is thought desirable to use a catalyst system in which the metallocene has a pair of bridged cyclopentadienyl groups, preferably with the bridge consisting of a single carbon, germanium or silicon atom so as to provide an open site on the catalytically active cation. The activator may be methyl alumoxane as described in U.S. Pat. Nos. 5,324,800; 5,580,939; and 5,633,394, incorporated by reference herein, (EP-129368) or a noncoordinated anion as described in U.S. patent application Ser. No. 08/133480, incorporated by reference herein, (EP-277004). It also thought desirable that there should be substantially no scavengers which may interfere with the reaction between the vinyl end unsaturation of polymers formed and the open active site on the cation. By the statement "substantially no scavengers" and "substantial devoid or free of Lewis acid scavengers", it is meant that there should be less than 100 ppm by weight of such scavengers present in the feed gas, or preferably, no intentionally added scavenger, e.g., an aluminum alkyl scavenger, other than that which may be present on the support.

The conditions optimal for the production of the polyethylene of the invention also require steady state polymerization conditions which are not likely to be provided by batch reactions in which the amounts of catalyst poisons can vary and where the concentration of the comonomer may vary in the production of the batch.

Overall continuous gas phase process for the polymerization of a polyethylene may thus comprise:

continuously circulating a feed gas stream containing monomer and inerts to thereby fluidize and agitate a bed of polymer particles, adding metallocene catalyst to the bed and removing polymer particles in which:
 a) the catalyst comprises at least one bridged bis cyclopentadienyl transition metal and an alumoxane activator on a common or separate porous support;
 b) the feed gas is substantially devoid of a Lewis acidic scavenger and wherein any Lewis acidic scavenger is preferably present in an amount less than 100 wt. ppm of the feed gas;
 the temperature in the bed is no more than 20° C. less than the polymer melting temperature as determined by DSC, at a ethylene partial pressure in excess of 60 pounds per square inch absolute (414 kPaa), and
 d) the removed polymer particles have an ash content of transition metal of less than 500 wt. ppm, the MI is less than 10, the MIR is at least 35 with the polymer having substantially no detectable chain end unsaturation as determined by HNMR By the statement that the polymer has substantially no detectable end chain unsaturation, it is meant that the polymer has vinyl unsaturation of less than 0.1 vinyl groups per 1000 carbon atoms in the polymer, e.g., less than 0.05 vinyl groups per 1000 carbon atoms, e.g., 0.01 vinyl groups per 1000 carbon atoms or less.

The process aims to provide the polyethylene of the invention throughout the use of a single catalyst and the process does not depend on the interaction of bridged and unbridged species. Preferably the catalyst is substantially devoid of a metallocene having a pair of pi bonded ligands (e.g., cyclopentadienyl compounds) which are not connected through a covalent bridge, in other words, no such metallocene is intentionally added to the catalyst, or preferably, no such metallocene can be identified in such catalyst, and the process uses substantially a single metallocene species comprising a pair of pi bonded ligands at least one of which has a structure with at least two cyclic fused rings (e.g., indenyl rings). Best results may be obtained by using a substantially single metallocene species comprising a monoatom silicon bridge connecting two polynuclear ligands pi bonded to the transition metal atom.

The catalyst is preferably supported on silica with the catalyst homogeneously distributed in the silica pores. Preferably, fairly small amounts of methyl alumoxane should be used, such as amounts giving an Al to transition metal ratio of from 400 to 30, and especially of from 200 to 50.

In order to obtain a desired melt index ratio, the molar ratio of ethylene and comonomer can be varied, as can concentration of the comonomer. Control of the temperature can help control the MI. Overall monomer partial pressures may be used which correspond to conventional practice for gas phase polymerization of LLDPE.

The parameters used in the claims and the examples are defined as follows

Melt Index: ASTM D-1238- Condition E

Melt Index ratio: this is ratio of $I_{21}$ over $I_2$ as determined by ASTM D-1238.

Mw, Mn and Mw/Mn: determined by GPC using a DRI (differential refraction index) detector.

Gel permeation chromatography (GPC) is performed on a Waters 150C GPC instrument with DRI detectors.

GPC Columns are calibrated by running a series of narrow polystyrene standards. Molecular weights of polymers other than polystyrenes are conventionally calculated by using Mark Houwink coefficients for the polymer in question.

CDBI is determined as set out in column 7 and 8 of WO9303093 as well as in Wild et al, J. Poly. Sci., Poly. Phys. Ed., Vol.20, p.441 (1982) and U.S. Pat. No. 5,008,204, which are incorporated by reference herein.

SCB (short chain branching): This was determined by HNMR (hydrogen nuclear magnetic resonance) with data collected at 500 Mhz. Spectra were referenced by setting the polymer backbone signal to 1.347 ppm. Methyl group contents in ethylene 1-olefin copolymers were calculated from the HNMR spectrum using the following formula:

Methyl Groups/1000 Carbons=$(I_{CH3}*0.33*1000)/(I_{0.5-2.1ppm}*0.5)$ where $I_{CH3}$ is the normalized methyl signal area in the region between 0.88 and 1.05 ppm and $I_{0.5-2.1ppm}$ the area between 0.50 and 2.10 ppm.

The amount of methyl groups will correspond to the number of short chain branches in the polymer assuming that the short chain branches contain 1 methyl ($-CH_3$) group and that all methyl groups are a result of short chain branching. The same NMR method can be used to determine vinyl end unsaturation.

Density: ASTM D-1505

Haze %: ASTM D-1003-95

Dart Impact Strength, 26 inch: ASTM D1709-91

1% secant Modulus: ASTM D-882-91

The "averaged Modulus" is the sum of the 1% secant Modulus in the machine direction and in the transverse direction divided by two.

Elmendorf tear strength ASTM D1922-94

Granular Bulk Density: The granular polymer particles are poured via a 7/8" diameter funnel into a fixed volume cylinder of 400 ml. The bulk density is measured as the weight of resin divided by 400 ml to give a value in g/ml.

Particle Size: The particle size is measured by determining the weight of material collected on a series of U.S. Standard sieves and determining the weight average particle size in micrometers based on the sieve series used.

Extractability: determined according to FDA regulations 21CFR 177.1520(d) (3) (ii).

EXAMPLES

Two runs are illustrated in detail below.

Catalyst preparation

Run 1 Supported Catalyst Preparation:

A solution of 1300 ml of 30 wt % alumoxane (MAO) in toluene as determined by reference to the total Al content, which may include unhydrolyzed TMA was charged to a two gallon(7.57 Liter), jacketed glass-walled reactor, equipped with a helical ribbon blender and an auger-type shaft. 2080 ml of toluene was added and stirred. A suspension of 31.5 g dimethylsilyl-bis-(tetrahydroindenyl) zirconium dichloride ($Me_2Si(H_4Ind)_2ZrCl_2$) in 320 ml of toluene purchased from Albemarle Labs, was cannulated to the reactor. An additional bottle of dry toluene (250 ml) was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (1040 g, Davison MS 948, 1.65 mug pore volume was charged to the reactor. Half of the solution from the 4 liter Erlenmeyer flask was then transferred back to the 2 gallon (7.57 liter) stirred glass reactor. The reaction temperature rose from 70° F. (21.1° C.) to 100° F. (37.8° C.) in a five minute exotherm. The balance of the solution in the 4 liter Erlenmeyer was subsequently added back to the glass reactor, and stirred twenty minutes. Then, toluene was added (273 ml, 238 g) to dilute the active catalyst slurry, and stirred an additional twenty-five minutes. Antistat AS-990, a surface modifier made from ethoxylated stearylamine sold by Witco Chemical Corp. (7g in 73 ml toluene) was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then five additional hours of drying at 142° F. (61.1° C.) to 152° F. (66.7° C.) and vacuum which ranged from 5 inches to 22 inches Hg (127 to 559 mmHg) were used to dry the support and yield 1709.0 g of free-flowing active supported catalyst material. Head space gas chromatograph (HSGC) measurements showed 13,000 weight parts per million (1.3 wt %) of residual toluene. A second drying step under stronger vacuum conditions, resulted in HSGC analysis measurement of residual toluene at 0.18%. Elemental analysis showed 0.40% Zr, 10.75% Al, 30.89% Si, 0.27% Cl, 9.26% C, 2.05% H (all percentages shown herein are weight percent).

Run 2 Supported Catalyst Preparation:

A solution of 1125 ml of 30 wt % alumoxane (MAO) in toluene as determined by reference to the total Al content which may include unhydrolyzed TMA was charged to a two gallon (7.57 liter), jacketed glass-walled reactor, equipped with a helical ribbon blender and an auger-type shaft. 1800 ml of toluene was added and stirred. A suspension of 30.8 g dimethylsilyl-bis-(tetrahydroindenyl) zirconium dichloride ($Me_2Si(H_4Ind)_2ZrCl_2$) in 320 ml of toluene purchased from Albemarle Labs, was cannulated into the reactor. An additional 150 ml of toluene was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (899 g, Davison MS 948, 1.65 ml /g Pore Volume, V.) was charged to the reactor. Half of the solution from the 4 L Erlenmeyer flask was then transferred back to the 2 gallon (7.57 liter) stirred glass reactor. The reaction temperature rose from 70° F. (21.1° C.) to 100° F. (37.8° C.) in a five minute exotherm. The balance of the solution in the 4 liter Erlenmeyer was subsequently added back to the glass reactor, and stirred twenty minutes. Then, toluene was added (273 ml, 238 g) to dilute the active catalyst slurry, and stirred an additional twenty-five minutes. Antistat AS-990 was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then nine and a half additional hours of drying at 142° F. (61.1° C.) to 152° F. (66.7° C.) at a vacuum which ranged from 5 inches to 22 inches Hg (177 to 559 mmHg) were used to dry the support and yield 1291.4 g of free-flowing active supported catalyst material.

Fluid-Bed Polymerization:

The polymerization was conducted in a continuous gas phase fluidized bed reactor having a 16.5 inch (41.9 cm) diameter with a bed height of approximately 12 feet (3.6 M). The fluidized bed is made up of polymer granules. The gaseous feed streams of ethylene and hydrogen together with liquid comonomer were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid catalyst was injected directly into the fluidized bed using purified nitrogen as a carrier. Its rate of injection was adjusted to maintain a constant production rate of the polymer. The reacting bed of growing polymer particles is maintained in a fluidized state by the continuous flow of the make up feed and recycle gas through the reaction zone. A superficial gas velocity of 1–3 ft/sec (0.3 to 0.9 m/sec) was used to achieve this. The reactor was operated at a total pressure of 300 psig (2068 kPa gauge). To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst and cocatalyst.

TABLE 1

| Polymerization Run Condition | Run 1 | Run 2 |
|---|---|---|
| Zr (wt %) | 0.43 | 0.50 |
| Al (wt %) | 11.6 | 11.4 |
| Al/Zr (mole/mole) | 91.2 | 77.1 |
| Temperature (° C.) | 79.4 | 85 |
| Pressure(bar) | 21.7 | 21.7 |
| Ethylene (mole %) | 25.0 | 49.9 |
| Hydrogen (mole ppm) | 275 | 445 |
| Hexene (mole %) | 0.23 | 0.32 |
| Bed Weight (Kg PE) | 113 | 121 |
| Production Rate (Kg PE/Hr) | 27.6 | 35.5 |
| Catalyst Productivity (Kg PE/Kg catalyst) | 1690 | 2287 |
| Bulk Density (g/ml) | 0.448 | 0.450 |
| Average Particle Size (micronmeters) | 920 | 803 |
| Ash (ppm) | 507 | 386 |

The parameters were determined as set out previously; the Zr, Al wt percent and ash levels were by elemental analysis.

No aluminum alkyl compounds were added to the reactor as scavenger. The runs were continued for around 3 days.

The polymers resulting were subjected to additional tests, where appropriate after first forming the polymer into film.

TABLE 2A

Polymer characterization

| | Run 1 | Run 2 |
|---|---|---|
| Density | 0.9190 | 0.9257 |
| MI | 1.10 | 0.62 |
| MIR | 46.0 | 57.6 |
| DRI Detector | | |
| Mw | 92,200 | 104700 |
| Mn | 18,300 | 17900 |
| Mz | 208,400 | 287500 |
| Mw/Mn | 5.04 | 5.85 |
| DSC 2nd Melt-See note 1 | | |
| 1st melting peak. (C.) | 108.6 | 122.6 |
| 2nd. melting peak. (C.) | 119.3 | 117.3 |
| CDBI | 86 | 83.10 |
| SCB (/1000 C.) | 15.4 | 10.6 |
| wt % C6 | 9.3 | 6.4 |
| mole % C6 | 3.3 | 2.2 |

Note 1: the sample had been molten and been allowed to cool once previously

TABLE 2B

Film Characterization

| | Run 1 | Run 2 |
|---|---|---|
| Blow up ratio | 2.5 | 25 |
| Gauge in mil (1 mil = 25.4 micronmeter) | 2.1 | 2.0 |
| 1% Secant Modulus, psi (N/cm$^2$) MD (machine direction) | 29420 (20284) | 45070 (31075) |
| TD (transverse direction), psi (N/cm$^2$) | 31230 (21532) | 47420 (32695) |
| MD + TD average, psi (N/cm$^2$) | 30325 (20908) | 46245 (31885) |
| Elmendorf tear strength (g/mil) | | |
| MD | 207 | 134 |
| TD | 430 | 477 |
| 26 inch (66 cm) Dart Impact Strength in g/mil | 410 | 156 |

TABLE 2B-continued

Film Characterization

| | Run 1 | Run 2 |
|---|---|---|
| Calculated DIS as a function of Modulus as per the formula DIS $\geq 0.8 \times [100 + e^{(11.71 - 0.000268 \times M + 2.183 \times 10^{-9} \times M^2)}]$, where M is averaged Modulus in psi and DIS is the (26 inch) dart impact strength in g/mil | 294 | 123 |
| HAZE (%) | 10.2 | 9.9 |
| Extractability | 1.0 | not available |

A larger number of further tests were performed with different samples made according to the invention in a similar manner and the results are shown in the Drawing 1. The function in the claim 1 is shown as a solid line.

Table 3 shows some exemplary values.

TABLE 3

Dart Impact Strength (26 inch)

| Averaged 1% Secant Modulus, M as Measured | | Calculated from Formula DIS $\geq 0.8 \times [100 + e^{(11.71 - 0.000268 \times M + 2.183 \times 10^{-9} \times M^2)}]$ | Measured |
|---|---|---|---|
| psi | N/cm$^2$ | g/mil | g/mil |
| 25,575 | 17,633 | 508 | 611 |
| 28,580 | 19,705 | 353 | 456 |
| 28,990 | 19,987 | 337 | 553 |
| 29,145 | 20,094 | 332 | 451 |
| 30,325 | 20,908 | 294 | 410 |
| 31,450 | 21,684 | 264 | 284 |
| 31,610 | 21,794 | 260 | 257 |
| 32,000 | 22,063 | 251 | 349 |
| 32,140 | 22,159 | 248 | 223 |
| 33,780 | 23,290 | 217 | 251 |
| 34,160 | 23,552 | 211 | 262 |
| 35,170 | 24,248 | 196 | 223 |
| 35,970 | 24,800 | 186 | 261 |
| 37,870 | 26,110 | 167 | 251 |
| 39,325 | 27,113 | 155 | 197 |
| 39,390 | 27,158 | 154 | 193 |
| 43,675 | 30,112 | 131 | 167 |
| 46,245 | 31,884 | 123 | 156 |
| 47,730 | 32,908 | 119 | 147 |
| 49,460 | 34,101 | 115 | 143 |

The claims therefore cover the combination of DIS and averaged Modulus in the area of the Drawing above the solid line.

Using the indications and guidance provided in the specification concerning catalyst selection, catalyst support and gas phase process operation it is possible to produce ethylene polymers as specified in the claims which are simultaneously optically clear; relatively easy to make and to process and have a high strength as measured by the Dart Impact Strength.

The films can be used for heavy duty bags, shrink film, agricultural film, particularly which are down-gauged such as garbage and shopping bags with a thickness of from 0.5 to 7 mil. The films can be produced by blow extrusion, cast extrusion, co-extrusion and be incorporated also in laminated structures.

We claim:

1. A polymer of ethylene and at least one alpha olefin having from 5 to 20 carbon atoms, which polymer has a Melt Index (MI) as herein defined of from 0.1 to 15; a Compositional Distribution Breadth Index (CDBI) as defined herein of at least 70%, a density of from 0.910 to 0.930 g/ml; a Haze value as herein defined of less than 20%; a Melt Index ratio (MIR) as herein defined of from 35 to 80; an averaged Modulus (M) as herein defined of from 20,000 to 60,000 psi (pounds per square inch) and a relation between M and the Dart Impact Strength in g/mil (DIS) complying with the formula:

$$DIS \geq 0.8 \times [100 + e^{(11.71 - 0.000268 \times M + 2.183 \times 10^{-9} \times M^2)}].$$

2. The polymer according to claim 1 which the relation between the average Modulus and the Dart Impact Strength (DIS) complies with the formula:

$$DIS \geq 0.8 \times [100 + e^{(11.71 - 0.000268 \times M + 2.183 \times 10^{-9} \times M^2)}].$$

3. The polymer of claim 1 wherein the comonomer has from 5 to 10 carbon atoms.

4. The polymer of claim 1 wherein the comonomer has from 5 to 8 carbon atoms.

5. The polymer according to claim 2 in which the density is from 0.915 to 0.927 g/ml, the MI is from 0.3 to 10 and the CDBI is at least 75%.

6. The polymer according to claim 5 in which the DIS is from 120 to 1000 g/mil.

7. The polymer according to claim 6 in which the levels of extractables as defined herein is less than 2.6 wt %.

8. A film comprising at least one layer of the polymer according to claim 7.

9. The film according to claim 8 in which the layer has a thickness of from 0.5 to 7 mil and is a mono-layer film.

10. The polymer according to claim 1 in which the density is from 0.915 to 0.927 g/ml, the MI is from 0.3 to 10 and the CDBI is at least 75%.

11. The polymer according to claim 2 in which the DIS is from 120 to 1000 g/mil.

12. A film comprising at least one layer of the polymer according to claim 1.

* * * * *